(12) United States Patent
Matsui

(10) Patent No.: US 12,059,639 B2
(45) Date of Patent: Aug. 13, 2024

(54) PROCESSING MACHINE

(71) Applicant: SUGINO MACHINE LIMITED, Uozu (JP)

(72) Inventor: Taiki Matsui, Uozu (JP)

(73) Assignee: SUGINO MACHINE LIMITED, Uozu (JP)

(*) Notice: Subject to any disclaimer, the term of this patent is extended or adjusted under 35 U.S.C. 154(b) by 563 days.

(21) Appl. No.: 17/494,144

(22) Filed: Oct. 5, 2021

(65) Prior Publication Data

US 2022/0371140 A1 Nov. 24, 2022

(30) Foreign Application Priority Data

May 19, 2021 (JP) ................................ 2021-084542

(51) Int. Cl.
*B01D 29/23* (2006.01)
(52) U.S. Cl.
CPC .......... *B01D 29/23* (2013.01); *B01D 2221/14* (2013.01)
(58) Field of Classification Search
CPC ..................................................... B01D 29/23
See application file for complete search history.

(56) References Cited

U.S. PATENT DOCUMENTS 5,281,021 A 1/1994 Rock et al.

FOREIGN PATENT DOCUMENTS

| CN | 210411721 U | 4/2020 |
| JP | H10-202463 A | 8/1998 |
| JP | 2002-126969 A | 5/2002 |
| JP | 2005-047005 A | 2/2005 |

OTHER PUBLICATIONS

Chinese Office Action mailed on Sep. 29, 2023 in a corresponding Chinese Patent Application No. 202111294927.7 (7 pages).
Office Action mailed on Jul. 1, 2021 in a corresponding Japanese Patent Application No. 2021-084542 (4 pages).

*Primary Examiner* — Jason Y Ko
(74) *Attorney, Agent, or Firm* — United IP Counselors, LLC

(57) ABSTRACT

Provided is an easy and clean processing machine. The processing machine includes a processing chamber having a discharge port; a tank having an inflow port with a gap from the discharge port; a drawer to be stowed in the processing chamber and pulled out rearward from the processing chamber, the drawer including a front plate, a pair of side plates, and a bottom plate including a filter disposed in a front portion, a guide including a stopper; and a slider including a latch portion to collide with the stopper to stop the drawer at an intermediate position. The discharge port is located above the bottom plate, and the filter is located above the inflow port when the drawer is located at the intermediate position.

20 Claims, 13 Drawing Sheets

PROCESSING MACHINE

CROSS-REFERENCE TO RELATED APPLICATIONS

This application claims the benefit of priority to Japanese Patent Application No. 2021-084542, filed on May 19, 2021, the entire contents of which are hereby incorporated by reference.

BACKGROUND

1. Technical Field

The present invention relates to a processing machine.

2. Description of the Background

A conventional machine tool includes a bed, an outflow portion, a cutting oil reservoir, and a chip separation means (Japanese Patent Publication No. 2002-126969; hereinafter referred to as Patent Literature 1). The bed includes a flow path surface portion through which the cutting oil material dropped from the machining site flows. The outflow portion flows out collected material containing chips and cutting oil material flowing through the flow path surface portion to the outside of the bed. The cutting oil reservoir is attached to the outside of the bed to store the cutting oil. The chip separation means is provided in the cutting oil reservoir, and separates the chip from the collected material to cause the cutting oil material to flow into the cutting oil reservoir.

BRIEF SUMMARY

Foreign matters such as chips separated from the collected material or steam from the tank may be exposed to the outside of the machine.

An object of the present invention is to provide a processing machine which is clean and easy to maintain.

A first aspect of the present invention provides a processing machine, including:
- a processing chamber having a discharge port facing downwardly;
- a tank fixed to the processing chamber, the tank having an inflow port below the discharge port with a gap;
- a drawer configured to be stowed in the processing chamber and pulled out rearward from the processing chamber, the drawer including
  - a front plate located rearward of the processing chamber,
  - a pair of side plates connected to the front plate, and
  - a bottom plate connected to the front plate and the pair of side plates, the bottom plate including a filter disposed in a front portion,
- a guide configured to guide the drawer, the guide including a stopper; and
- a slider configured to reciprocate along the guide, the slider including a latch portion configured to collide with the stopper to stop the drawer at an intermediate position;
- wherein the discharge port is located above the bottom plate, and the filter is located above the inflow port when the drawer is located at the intermediate position.

The processing machine includes a deburring machine using high-pressure jet and a cleaning machine.

Preferably, the front plate has a handle. Preferably, the front plate extends to the vicinity of the upper surface of the tank. The front plate suppresses processing liquid that has passed through the bottom plate from flowing out to the rear of the drawer.

The guide extends in the longitudinal direction. The drawer is pulled out along the guide. The cleaning chamber may include a frame plate. The guide may be arranged on a frame plate. The drawer may be housed between the frame plates.

The lower end of the back plate may extend to the vicinity of the upper surface of the tank.

The bottom plate may be inclined such that it becomes shallower towards the front plate. The filter is disposed in the front portion of the bottom plate. The filter may be disposed on the back plate or the side plate. When the drawer is at the intermediate position, the rear end of the filter is located frontward from the rear end of the inflow port. For example, the filter is a punching metal or wire mesh. Preferably, the filter is positioned at a height near the upper surface of the tank.

The bottom plate may be box-shaped having an opening upward. At this time, the filter may be disposed on the surface of the box-shaped bottom plate closer to the back plate, and a portion of the side plate closer to the back plate. The processing liquid may be discharged from the surface of the box-shaped bottom plate closer to the back plate, and the side surface. The box-shaped bottom plate extends downwardly. Preferably, the bottom surface of the box-shaped bottom plate is located near the upper surface of the tank.

The side plate extends from the bottom to the center of the front plate in height direction. The side plate may extend from the bottom to the top of the front plate. Preferably, the side plate extends to the vicinity of the upper surface of the tank. Preferably, the side plate extends above the discharge port when the drawer is at the stowed position. The side plate suppresses the processing fluid passing through the bottom plate from flowing out to the lateral side of the drawer.

A pair of sliders may be arranged. Each of the pair of side plates may include a slider. The slider and the drawer integrally reciprocate on the guide.

The stopper is disposed in the tank or cleaning chamber.

The drawer is pulled out to the outside of the processing chamber from a stowed position housed below the processing chamber. When the drawer is pulled out, the latch portion abuts against the stopper to temporarily stop at the intermediate position. At the intermediate position, the drawer can be further pulled out, for example, by pulling up the drawer to remove the latch portion from the stopper. When the drawer is pulled out beyond the intermediate position, the drawer reaches the drawer end where substantially the entire surface of the bottom plate is exposed. The drawer may be removed from the processing chamber beyond the drawer end.

The overflow port is located above the back plate. When hanging portion is arranged, the lower surface of the overflow port may be disposed near the upper surface of the hanging portion. When the bottom plate or the basket filter is clogged, the processing liquid overflows from the overflow port. The processing liquid overflowing from the overflow port flows into the tank through the inflow port.

Preferably, when the drawer is at the stowed position, the inflow port extends in front of the drawer.

The tank may have a return plate. The return plate is disposed around the inflow port. The return plate extends upwardly from the inflow port. For example, the return plate is located at the front end of the inflow port. When the back plate is disposed, the return plate is disposed in front of the back plate.

The return plate may be disposed on a lateral side of the inflow port. The return plate disposed laterally suppresses the processing liquid passing through the bottom plate from flowing out to the lateral side of the inflow port. When the return plate is arranged laterally, the side plates do not have to extend to the vicinity of the top surface of the tank.

The pair of handles each have a handle portion. Preferably, the handle portion is located above the discharge port. The pair of handles may be located inside the pair of side plates.

According to the present invention, a processing machine which is clean and easy to maintain is provided.

DETAILED DESCRIPTION

First Embodiment

Figure 1:
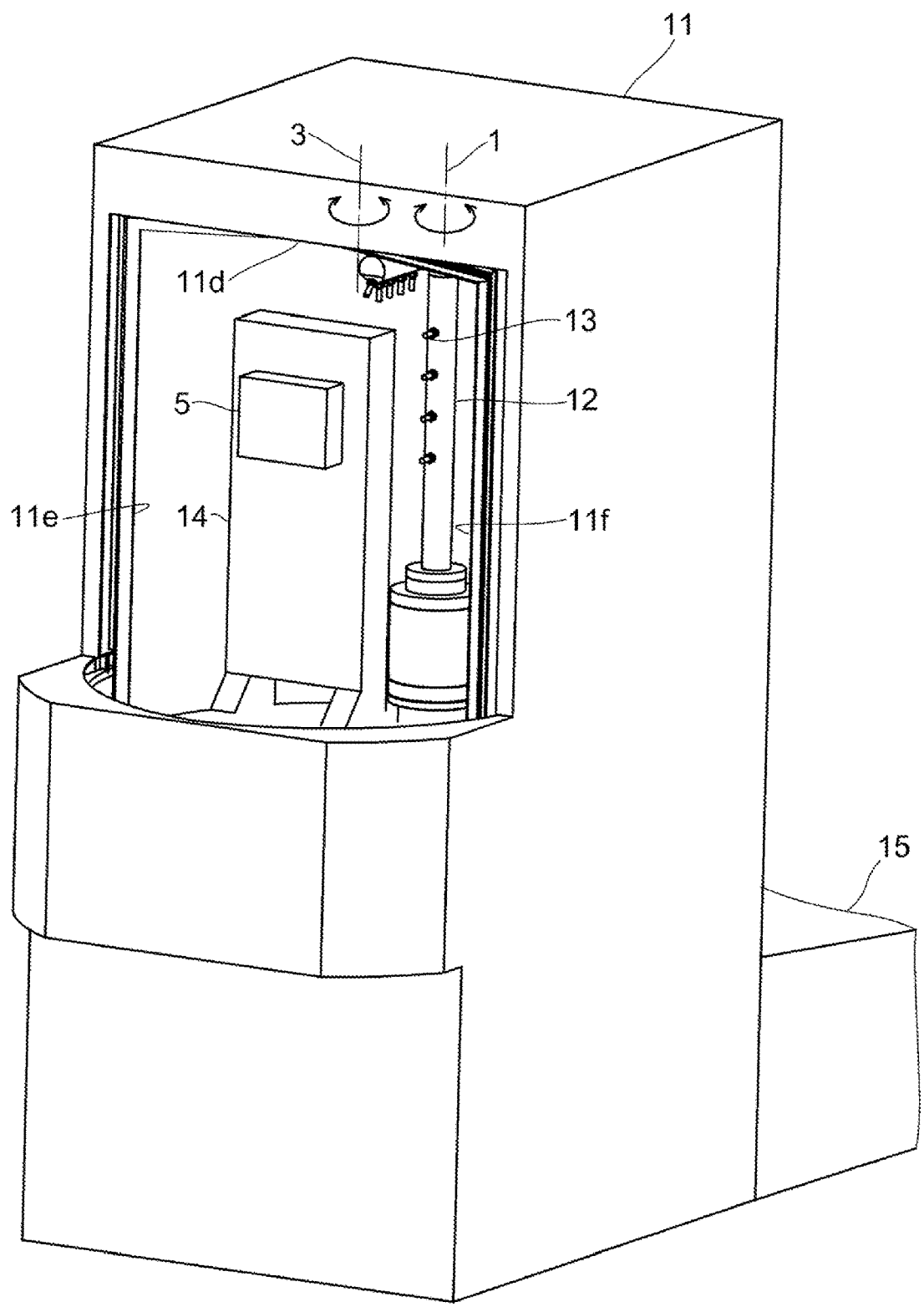
FIG. 1 is a front perspective view of a cleaning machine according to a first embodiment.

As shown in FIG. 1, a cleaning machine 10 of the present embodiment includes a cleaning chamber (processing chamber) 11, a nozzle holder 12, a nozzle 13, a table 14, and a tank 15. The cleaning chamber 11 includes a loading port 11d, a left door 11e, and a right door 11f. The tank 15 stores cleaning liquid (processing liquid) 7. The tank 15 is fixed to the cleaning chamber 11. For convenience, the direction toward a front of the cleaning machine 10 is referred to as frontward, the direction toward a rear of the cleaning machine 10 is referred to as rearward, and the lateral direction as viewed from front of the cleaning machine 10 is referred to as a lateral direction or a left-right direction.

The cleaning chamber 11 is a hollow box. The loading port 11d may also serve as an unloading port. The left door 11e and the right door 11f close the loading port 11d. For example, the loading port 11d is located on the front surface of the cleaning chamber 11.

The nozzle holder 12, the nozzle 13, and the table 14 are disposed inside the cleaning chamber 11. A cleaning workpiece 5 is placed on the table 14. For example, the table 14 rotates about a table rotation axis 3. The nozzle 13 is disposed on the nozzle holder 12. For example, the nozzle 13 rotates about a nozzle rotation axis 1 integrally with the nozzle holder 12. The nozzle 13 ejects cleaning liquid 7 onto the cleaning workpiece 5. The nozzle rotation axis 1 and the table rotation axis 3 extend in the vertical direction. The table 14 and the nozzle 13 rotate synchronously. The cleaning liquid 7 ejected from the nozzle 13 collides with the entire surface of the cleaning workpiece 5 to clean the cleaning workpiece 5.

Figure 2:
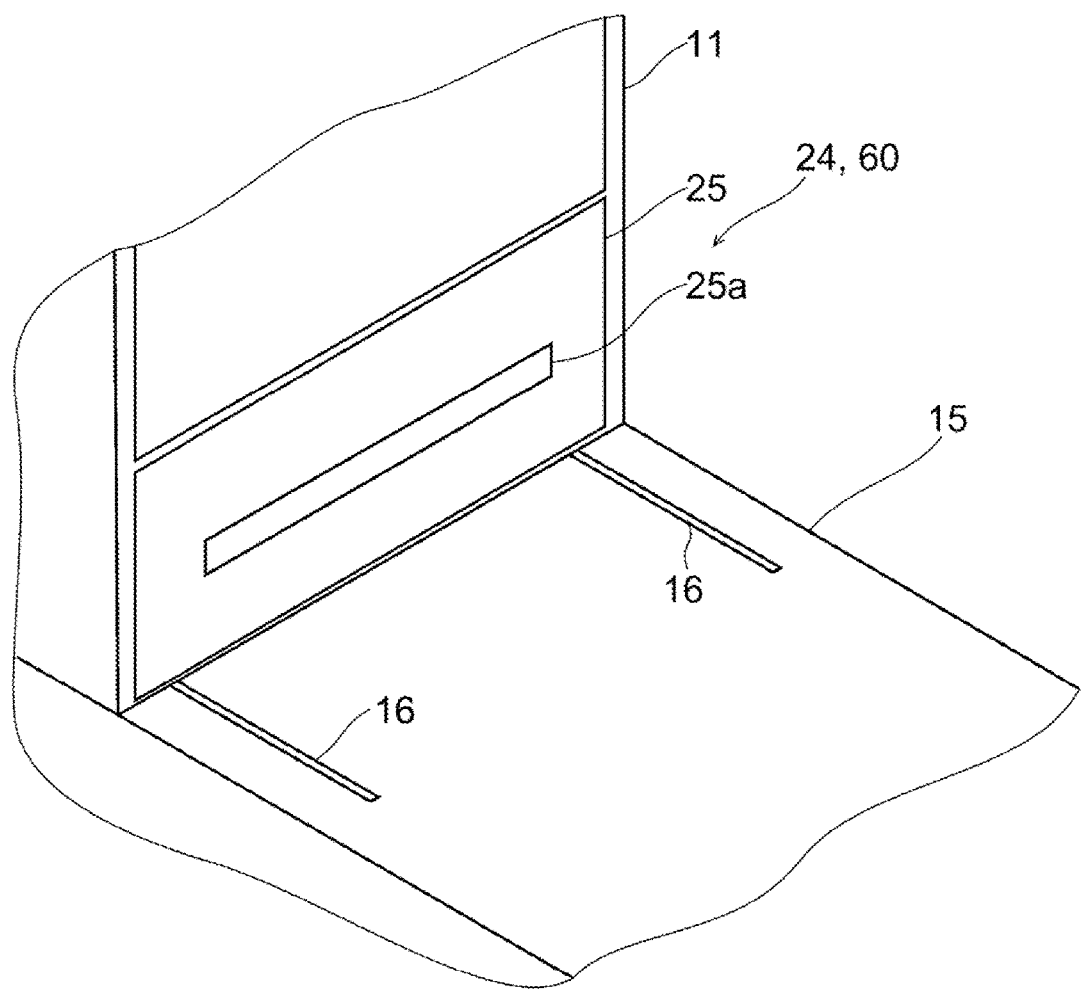
FIG. 2 is a rear perspective view of the cleaning machine according to the first embodiment.

As shown in FIG. 2, the cleaning machine 10 includes a drawer 24. The drawer 24 is housed in a lower portion of the cleaning chamber 11 and above the tank 15. For example, the drawer 24 is drawn rearward from the cleaning chamber 11.

Figure 3:
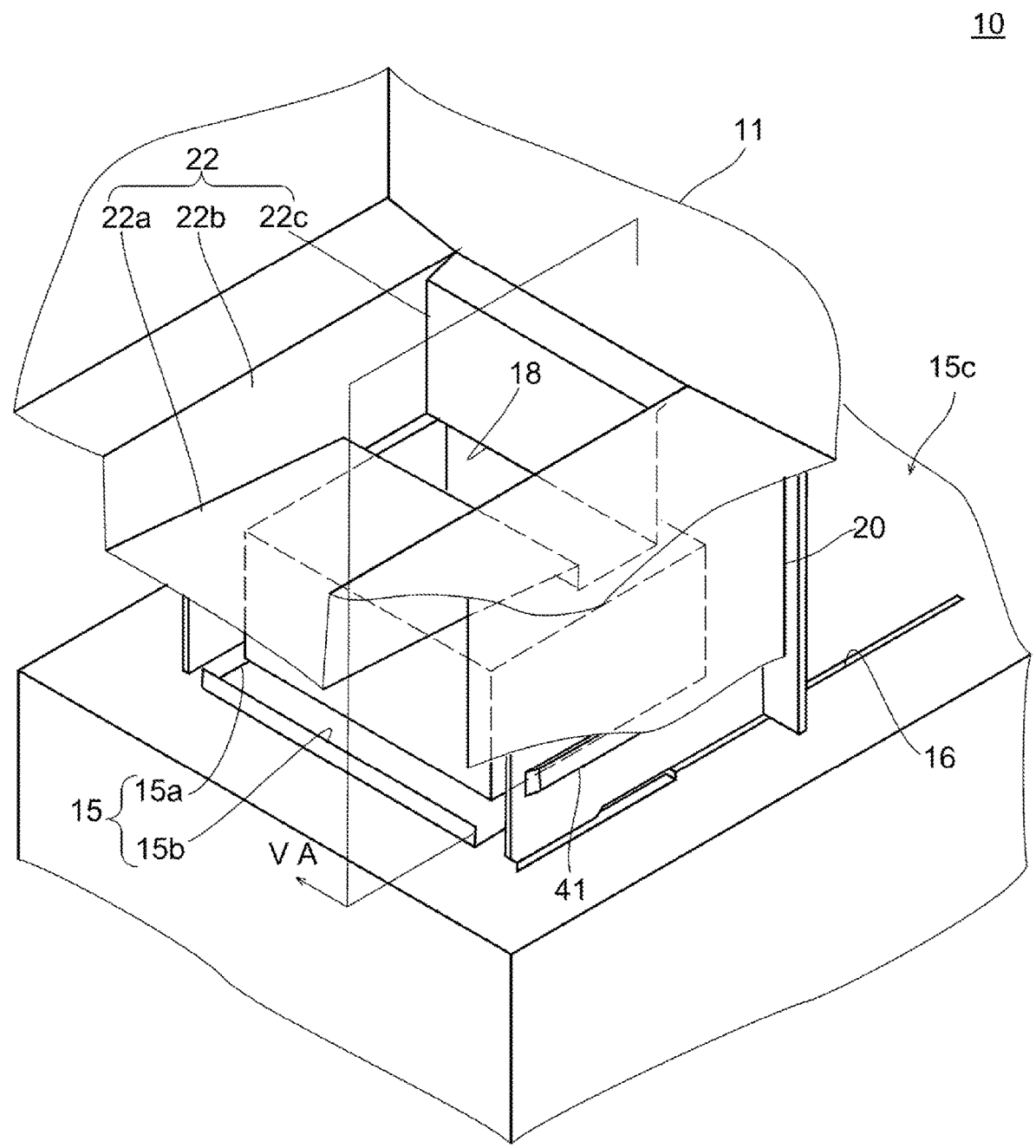
FIG. 3 is a perspective view showing a vicinity of a discharge port of the cleaning machine according to the first embodiment.

FIG. 3 is a perspective view of the inside of the cleaning chamber 11. As shown in FIG. 3, the cleaning chamber 11 has a discharge port 18. The tank 15 has an inflow port 15a, a return plate 15b, and an upper surface 15c. The cleaning liquid 7 ejected from the nozzle 13 is discharged from the discharge port 18 to flow into the tank 15 via the inflow port 15a.

The cleaning chamber 11 may include a duct 22 and a frame plate 20. The duct 22 is an L-shaped flow path. The upper part of the duct 22 opens into the cleaning chamber 11. The duct 22 is disposed at a lower portion of the cleaning chamber 11.

The duct 22 includes a bottom plate 22a, a side plate 22b, and a rear plate 22c. The bottom plate 22a is connected to the bottom of the cleaning chamber 11. The side plate 22b is connected to the bottom plate 22a and the bottom of the cleaning chamber 11. The rear plate 22c is connected to the side plate 22b and the bottom of the cleaning chamber 11. The rear plate 22c is disposed slightly frontward from the rear surface of the cleaning chamber 11.

The frame plate 20 is disposed with a gap outside of the side plate 22b as viewed from the duct 22.

Figure 4:
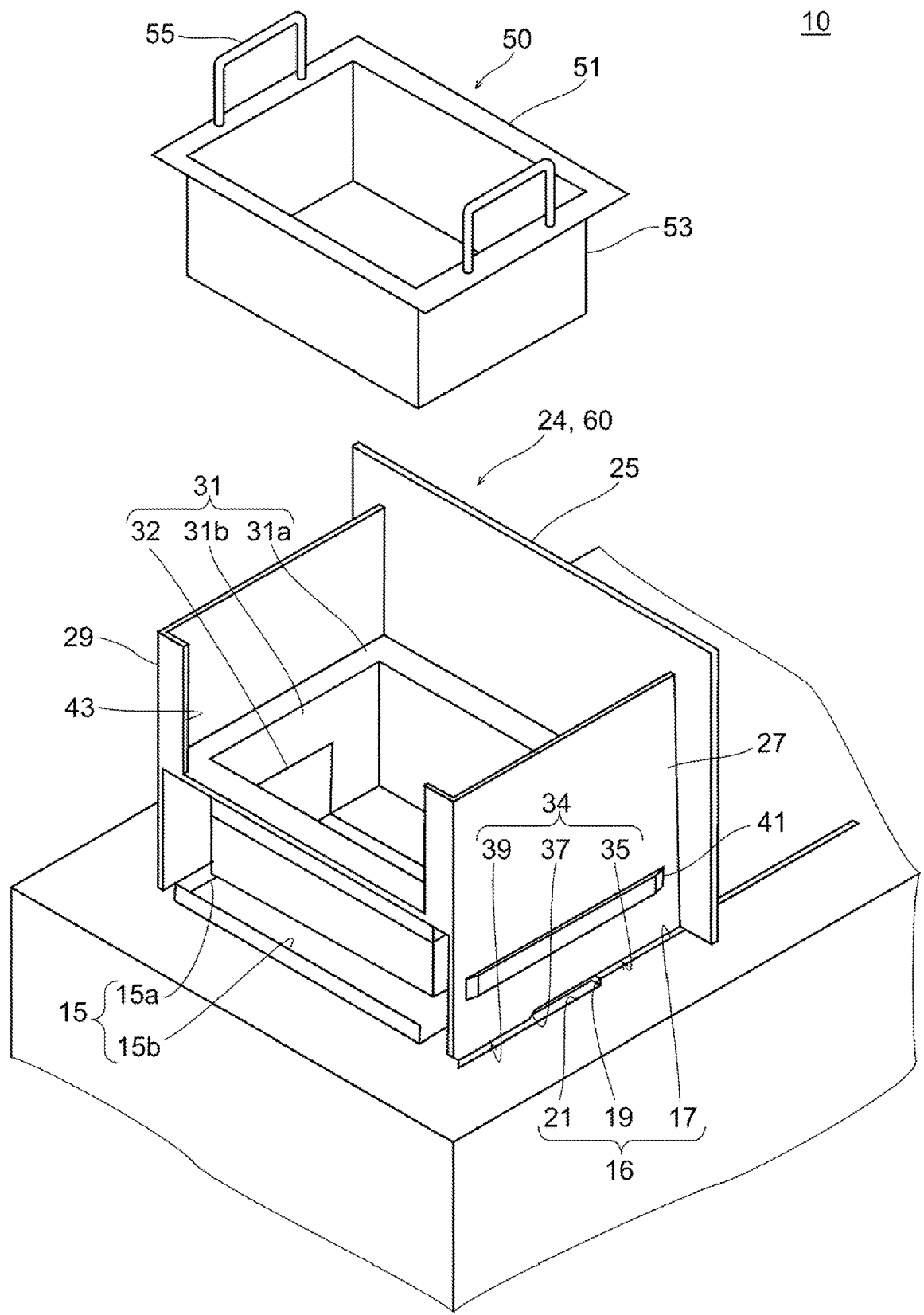
FIG. 4 is a perspective view showing a drawer, a basket filter and a guide according to the first embodiment.

FIG. 4 is a perspective view showing the drawer 24, a basket filter 50, and a guide. FIG. 4 is illustrated without the cleaning chamber 11, the duct 22 and the frame plate 20. As shown in FIG. 4, the drawer 24 includes a front plate 25, a side plate 27, a back plate 29, and a bottom plate 31. The front plate 25 of the drawer 24 is arranged at the rear of the cleaning machine 10.

The inflow port 15a is located at the upper surface 15c side of the tank 15 and below the drawer 24. The inflow port 15a has a length extending from the vicinity of the front plate 25 to a position slightly frontward from the front end of the drawer 24 in the front-rear direction. The inflow port 15a has a width extending slightly inward of the pair of side plates 27 in the lateral direction.

The return plate 15b is disposed in front of the inflow port 15a. The return plate 15b rises from the upper surface 15c of the tank 15. The return plate 15b has a width equal to or greater than the inflow port 15a.

A pair of guides 16 are disposed below the side plate 27. The guide 16 includes an upper guide groove 17, a step (stopper) 19, and a lower guide groove 21. The upper guide groove 17 is located above the lower guide groove 21.

The drawer 24 is housed below the cleaning chamber 11 at a stowed position 60. For example, the upper guide groove 17 has, in the longitudinal direction, a length extending from the central portion of the drawer 24 toward frontward to a lower sliding surface 39 (described later) when the drawer 24 is at the stowed position 60. The lower guide groove 21 has, in the longitudinal direction, a length extending from the front end portion of the drawer 24 to the front end of the upper guide groove 17.

The step 19 is located between the upper guide groove 17 and the lower guide groove 21. The step 19 is, for example, a vertical plane. The height of the step 19 is, for example, equal to the difference in the height of the bottom surface of the upper sliding surface 35 and the upper surface 15c.

When the drawer 24 is at the stowed position 60, the front plate 25 is substantially aligned with the rear surface of the cleaning chamber 11. The front plate 25 may have a handle 25a. A pair of side plates 27 are connected to the front plate 25 and the back plate 29. The pair of side plates 27 are disposed outside the duct 22. Preferably, when the drawer 24 is at the stowed position 60, the upper end of the side plate 27 extends above the discharge port 18. More preferably, the lower end of the side plate 27 extends to the upper surface of the tank 15.

A slider 34 is disposed on the lower surface of the side plate 27. The slider 34 has an upper sliding surface 35, a lower sliding surface 39, and a latch portion 37. When the drawer 24 is at the stowed position 60, the upper sliding surface 35 slides with the upper guide groove 17, and the lower sliding surface 39 slides with the lower guide groove 21. For example, the latch portion 37 is inclined so as to be lowered frontward.

For example, the bottom plate 31 includes a hanging portion 31a, a liquid receiving box 31b, and a filter 32. The hanging portion 31a is located at a central portion of the side plate 27 in a height direction. The hanging portion 31a may be disposed over the entire circumference of the drawer 24. The bottom plate 31 may have, for example, only a pair of hanging portions 31a in the front-rear direction or the left-right direction. The liquid receiving box 31b has an open upper surface. The liquid receiving box 31b is arranged inside and below the hanging portions 31a. The liquid receiving box 31b extends downward to the vicinity of the upper surface 15c of the tank 15.

The filter 32 is disposed in the liquid receiving box 31b. The filter 32 is disposed, for example, over the bottom surface, the front surface, and the side surface of the liquid receiving box 31b. The filter 32 is arranged so as to extend about front half of the liquid receiving box 31b.

The back plate 29 may have an overflow port 43. The overflow port 43 is located above the hanging portion 31a.

The cleaning machine 10 may have a side guide 41. The side guides 41 are disposed on both side surfaces of the side plate 27. The side guide 41 slides the frame plate 20 to guide the drawer 24 in the longitudinal direction.

Figure 5A:
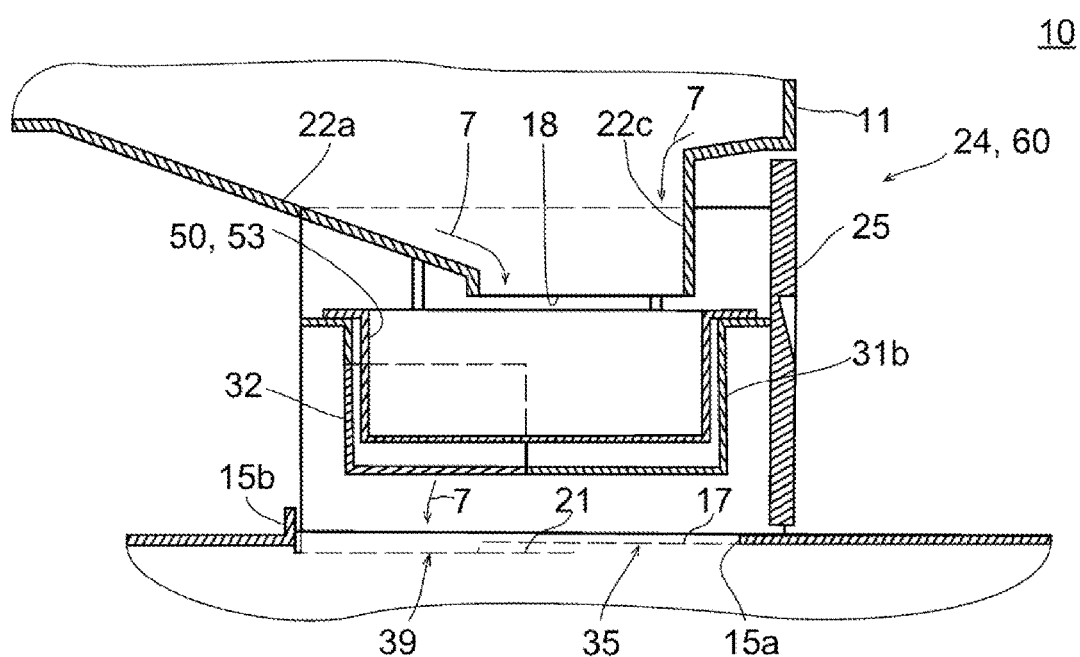
FIG. 5A is a cross-sectional view taken along VA plane in FIG. 3.

The drawer 24 may include a basket filter 50. The basket filter 50 includes a frame 51, a filter 53, and a pair of handles 55. The filter 53 has a box shape having an opening at the upper side. The filter 53 is disposed at the lower portion of the frame 51. For example, the pair of handles 55 are disposed above the frame 51. Referring to FIG. 5A, when the drawer 24 is at the stowed position 60, a pair of handles 55 each are located outside of the duct 22 and inside the side plates 22b. Among the pair of handles 55, the portion where the operator grips (handle portion) is located above the discharge port 18. In FIG. 4, the handle portion is a horizontal portion of the pair of handles 55. By hanging the frame 51 on the hanging portion 31a, the basket filter 50 is removably installed in the drawer 24. The basket filter 50 is accommodated in the liquid receiving box 31b.

FIG. 5A shows the drawer 24 at the stowed position 60. Normally, the drawer 24 is located at the stowed position 60.

As shown in FIG. 5A, the discharge port 18 is located above the basket filter 50 and the liquid receiving box 31b at the stowed position.

The cleaning liquid 7 is ejected in the cleaning chamber 11 to collide with the cleaning workpiece 5. The cleaning liquid 7 containing insoluble matter (foreign matter) flows on the bottom plate 22a, the side plate 22b, and the rear plate 22c to be discharged downward from the discharge port 18. The cleaning liquid 7 is filtered by the filter 53 to fall into the liquid receiving box 31b. The cleaning liquid 7 that has passed through the filter 53 is filtered by the filter 32. The cleaning liquid 7 flows into the tank 15 from the front of the liquid receiving box 31b through the filter 32 and the inflow port 15a.

As the cleaning machine 10 operates, insoluble matter accumulates inside the basket filter 50. The filter 32 is located in the front portion of the bottom plate 31. Therefore, the cleaning liquid 7 does not easily overflow to the rear of the tank 15. The return plate 15b is disposed in front of the inflow port 15a. Therefore, the cleaning liquid 7 having passed through the filter 32 is prevented from overflowing from the front of the inflow port 15a.

The liquid receiving box 31b extends downward to the vicinity of the upper surface 15c of the tank 15. The filter 32 is disposed at a height near the upper surface 15c. Therefore, the cleaning liquid 7 that has passed through the filter 32 easily flows into the inflow port 15a smoothly. Thus, the cleaning liquid 7 does not easily overflow to the periphery of the inflow port 15a.

A pair of side plates 27 are located outside the duct 22 so as to sandwich the duct 22. The pair of side plates 27 extends above the discharge port 18. Thus, the cleaning liquid 7 discharged from the discharge port 18 is prevented from flowing out of the pair of side plates 27 in the lateral direction above the side plates 27.

Further, the lower end of the pair of side plates 27 extend to the upper surface of the tank 15. Thus, the cleaning liquid 7 that has passed through the filter 32 below the side plate 27 is prevented from flowing out to the outside of the side surface of the side plate 27.

A pair of handles 55 are disposed outside the duct 22 so as to sandwich the duct 22. Thus, the cleaning liquid 7 discharged from the discharge port 18 is hardly splashed to the pair of handles 55. Further, the handle portion is located above the discharge port 18. Thus, the cleaning liquid 7 discharged from the discharge port 18 is hardly splashed to the handle portion. The cleaning liquid 7 discharged from the discharge port 18 contains an insoluble content such as chips and oil content. As the cleaning liquid 7 is hardly splashed to the pair of handles 55, the pair of handles 55 are prevented from being dirty with foreign matter. As the handle portion is located above the discharge port 18, the handle portion is prevented from being dirty. If chips adhere to the handle, the operator may cut his/her hand at the time of inspection. As the pair of handles 55 are located so as to sandwich the duct 22, it is easy to keep the inspection work in a safe state.

In the present embodiment, the bottom plate 31 extends downward in a box shape to the vicinity of the upper surface of the tank 15. The back plate 29 may extend to the vicinity of the upper surface of the tank 15.

The drawer 24 is pulled out while the slider 34 slides on the guide 16. At this time, the frame plate 20 is slid with the side guide 41 to guide the drawer 24. When the drawer 24 is pulled out, the latch portion 37 abuts against the step 19, and the drawer 24 temporarily stops at an intermediate position 61.

Figure 5B:
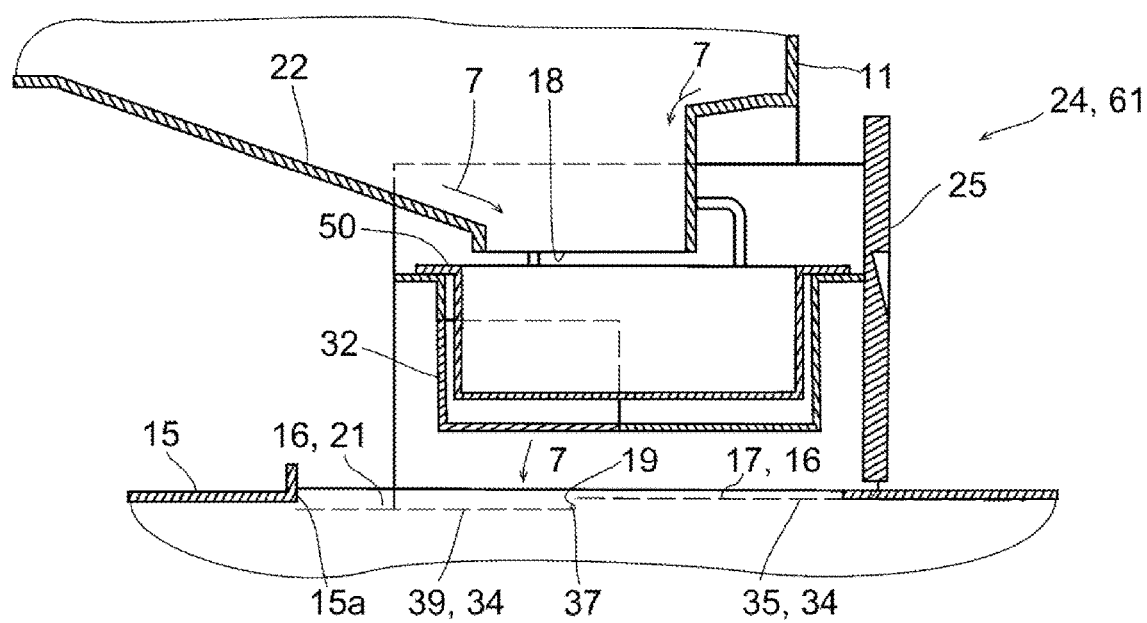
FIG. 5B is a cross-sectional view showing the drawer in FIG. 5A pulled out to an intermediate position.

As shown in FIG. 5B, at the intermediate position 61, the operator can visually recognize the inside of the drawer 24 from a gap between the front plate 25 and the cleaning chamber 11. The discharge port 18 is still located above the drawer 24 at the intermediate position 61. As the filter 32 is disposed in front of the bottom plate 31, the filter 32 is positioned above the inflow port 15a. Thus, even when the drawer 24 is at the intermediate position 61, the cleaning liquid 7 discharged from the discharge port 18 is filtered by the filter 53 and the filter 32. The cleaning liquid 7 passes through the filter 32 to flow into the tank 15 via inflow port 15a. That is, the drawer 24 can be pulled out to the intermediate position 61 even while the cleaning liquid 7 is discharged from the discharge port 18 during the operation of the cleaning machine 10.

In FIG. 5B, the operator can pull the drawer 24 upward until the latch portion 37 exceeds the step 19, and can pull the drawer 24 further rearward. At this time, the lower sliding surface 39 slides over the upper surface of the upper guide groove 17. Then, the upper sliding surface 35 slides on the upper surface 15c.

Figure 5C:
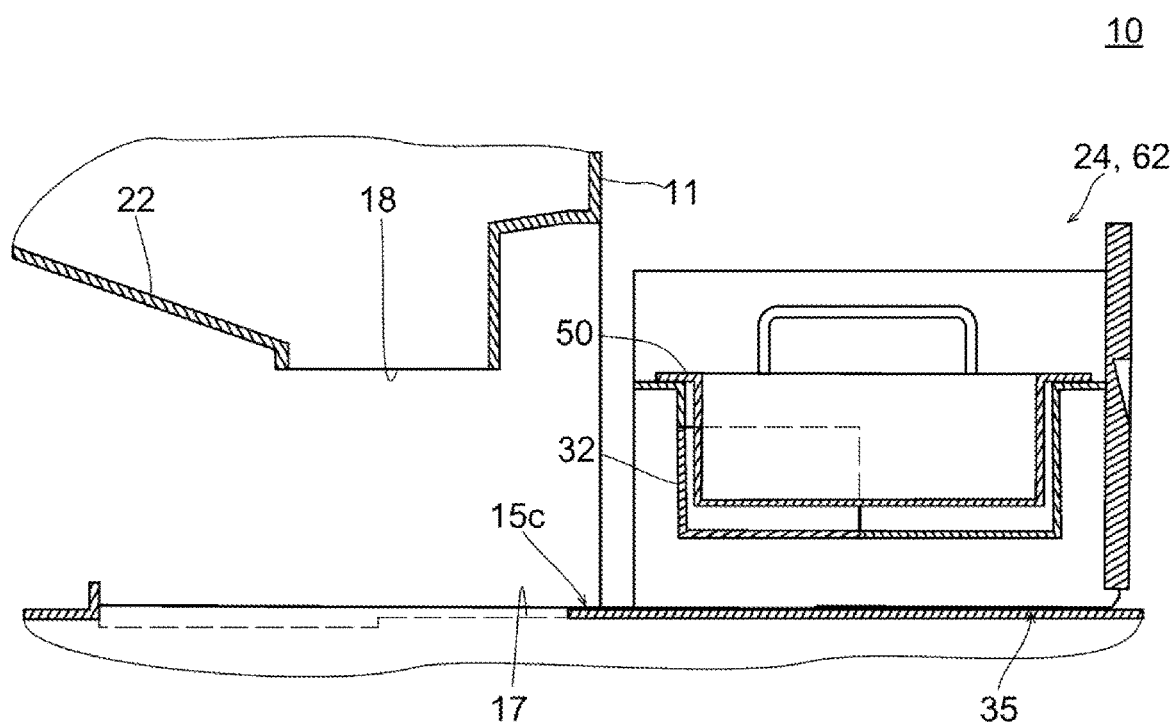
FIG. 5C is a cross-sectional view showing the drawer in FIG. 5B pulled out to a drawer end.

FIG. 5C shows the drawer 24 at the drawer end 62. As shown in FIG. 5C, when drawer 24 is positioned at the drawer end 62, basket filter 50 is completely exposed behind cleaning chamber 11. Thus, the basket filter 50 can be taken out from the drawer 24. A large portion of the foreign matter separated from the cleaning liquid 7 is deposited in the basket filter 50. By taking out the basket filter 50 from the drawer 24, foreign matter can be easily collected. Further, the filter 53 can be easily cleaned and replaced. By taking out the drawer 24 from the cleaning machine 10 at the drawer end 62, the operator can easily clean the inside of the drawer 24. The operator can also replace the drawer 24.

Note that when the drawer 24 is pulled out beyond the intermediate position 61, the cleaning liquid 7 is not filtered. Thus, the drawer 24 is normally cleaned when the cleaning machine 10 is stopped.

According to the present embodiment, the drawer 24 is positioned at the stowed position 60 below the cleaning chamber 11 during the operation of the cleaning machine 10. At this time, the inflow port 15a is covered by the drawer 24. Thus, the cleaning liquid 7 is not exposed to the upper surface 15c of the tank 15. This prevents the dust, chips, and liquid from entering into the filters 32, 53 and the tank 15 from outside of the cleaning machine 10.

In a state in which the drawer 24 is pulled out to the intermediate position 61, the cleaning liquid 7 discharged from the discharge port 18 continues to be filtered by the filters 32, 53. Thus, even during operation of the cleaning machine 10, the operator can pull out the drawer 24 to the intermediate position 61 to confirm the internal status of the filter 32, 53 from the outside.

In Patent Literature 1, the filter is exposed to the outside of the processing chamber, and the coolant falls into the filter. If coolant or coolant vapor enters the human body through the eyes, mouth, or nose, it may adversely affect the human body. In addition, the cleaning liquid 7 may emit vapor or an unpleasant odor. Conditions in which coolant falls into the filter outside the machining chamber and chips are deposited on the filter may give an unpleasant impression.

According to the present embodiment, the cleaning liquid 7 and the filters 32, 53 are not exposed to the outside of the cleaning machine 10. Thus, it is difficult to discharge vapor or odors to the outside of the cleaning machine 10. Further, it is suppressed that the cleaning liquid 7 enters into the human body of the operator. As the filters 32, 53 are accommodated in the cleaning machine 10, the aesthetics are improved, and the cleaning machine 10 is easily kept clean. In addition, the environment in which the cleaning machine 10 is installed is easily kept clean and comfortable.

Second Embodiment

Figure 6:
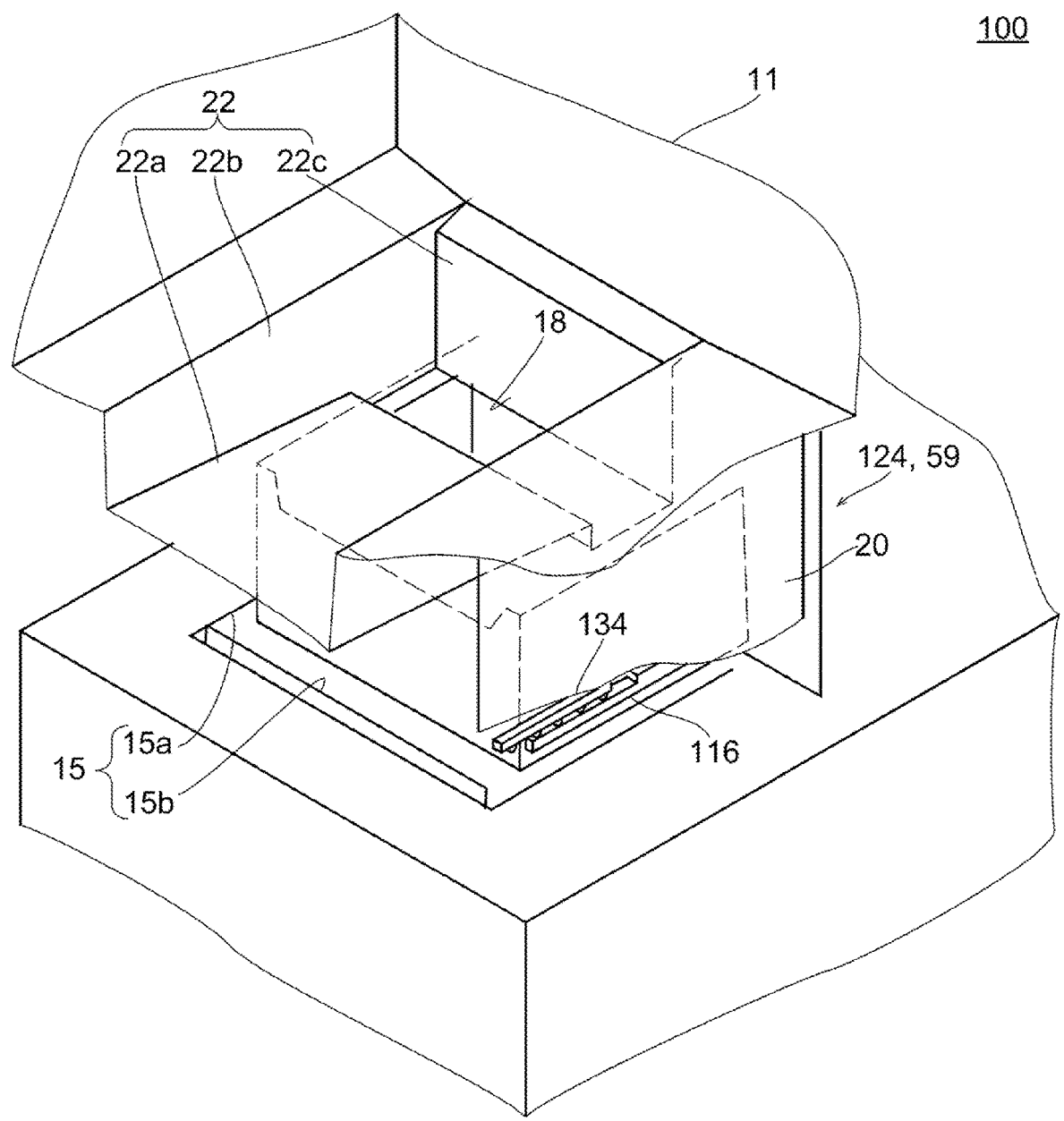
FIG. 6 is a perspective view of a cleaning machine according to a second embodiment showing a vicinity of a discharge port partially cutout.

As shown in FIG. 6, the cleaning machine 100 according to the present embodiment includes a cleaning chamber 11, a tank 15, a drawer 124, a pair of guide rails 116, an end stopper 157 (see FIG. 8A), and a slider 134. The slider 134 includes an upper slider 135 and a lower slider 139.

Figure 7:
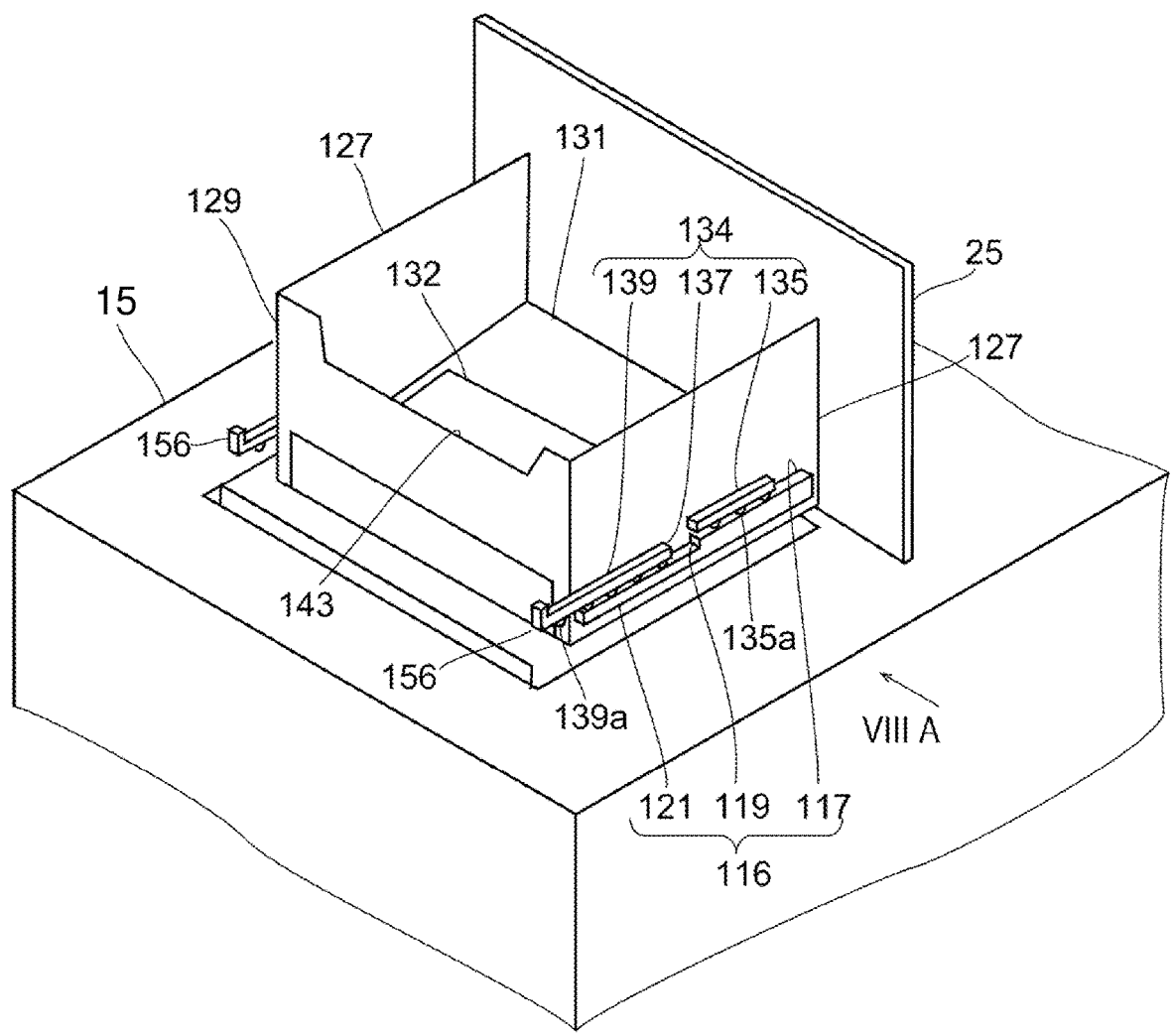
FIG. 7 is a perspective view of the drawer and the guide according to the second embodiment.

As shown in FIG. 7, the drawer 124 includes a front plate 25, a side plate 127, a back plate 129, and a bottom plate 131. The bottom plate 131 may include a filter 132. The lower end of the side plate 127 may not reach the upper surface 15c. For example, the lower end of the side plate 127 is located above the tank 15 and slightly below the guide rail 116 (described later). The back plate 129 may have an overflow port 143. The filter 132 is disposed in the front of the bottom plate 131. The bottom plate 131 is entirely inclined downward toward front direction. The filter 132 may be disposed at the lower portion of the back plate 129.

The guide rail 116 is disposed, for example, on the frame plate 20. The guide rail 116 may be disposed on the tank 15. The guide rails 116 extend in the front-rear direction at middle portion of the side plate 127 in the vertical direction. The guide rail 116 includes an upper rail 117, a lower rail 121, and a step (stopper) 119.

The upper rail 117 is disposed above the lower rail 121. When the drawer 124 is at the stowed position 60, the upper rail 117 extends from the vicinity of the front plate 25 to the center portion of the side plate 127. The step 119 is disposed at the center of the guide rail 116. The step 119 is, for example, a vertical plane. The lower rail 121 extends from the step 119 to the vicinity of the back plate 129.

Figure 8A:
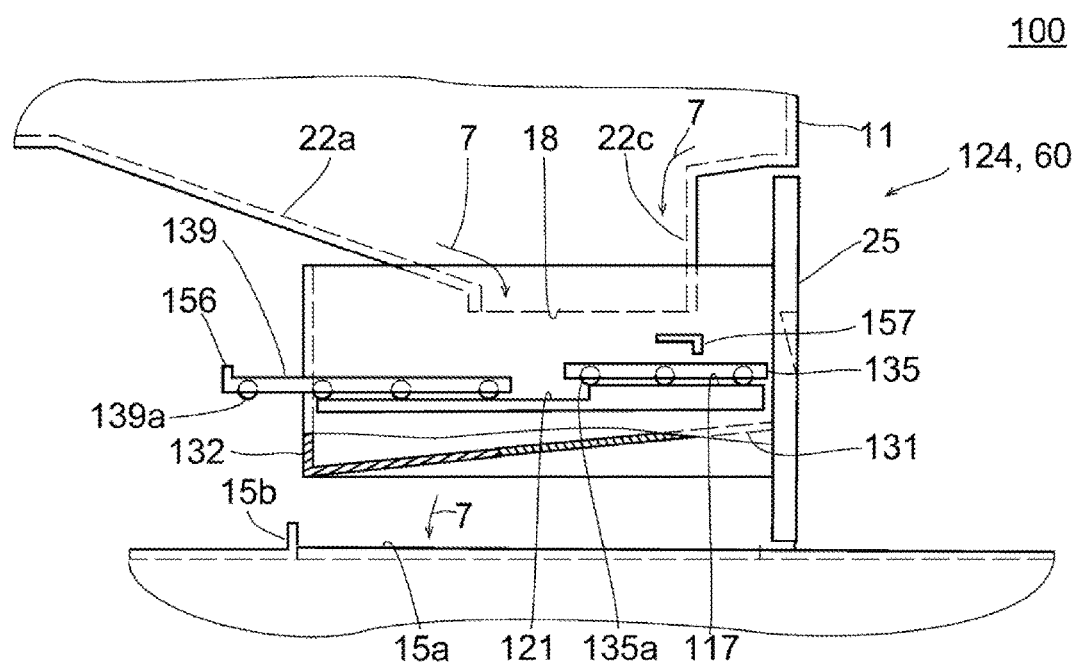
FIG. 8A is VIIIA arrow view in FIG. 7.
Figure 8B:
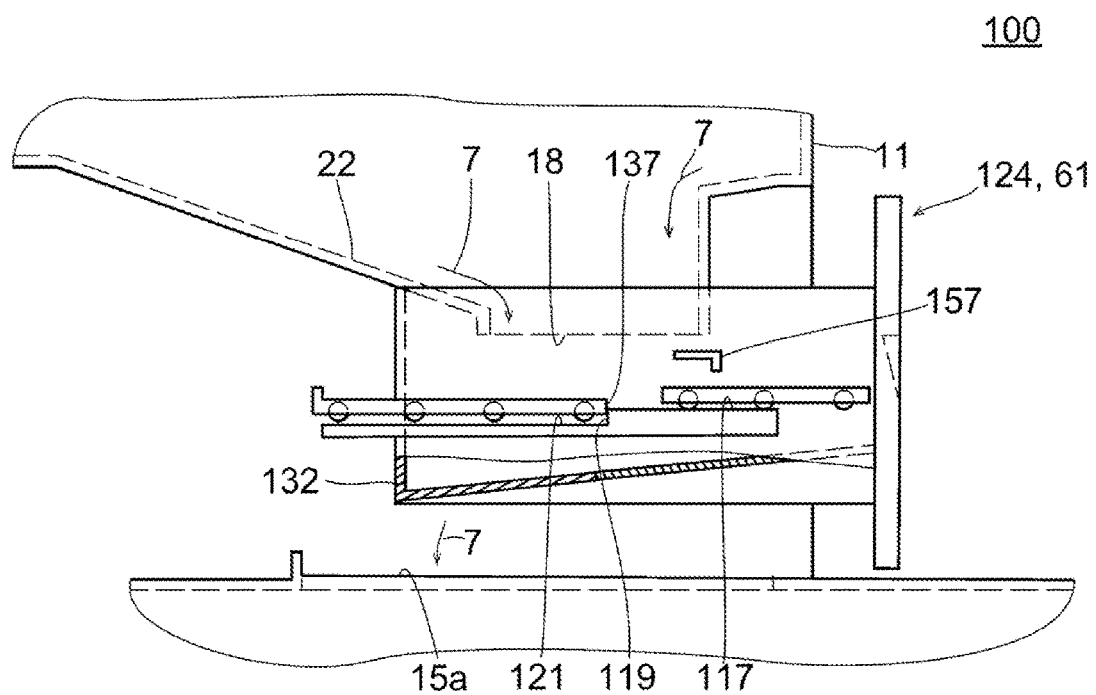
FIG. 8B is a cross-sectional view showing the drawer in FIG. 8A pulled out to an intermediate position.
Figure 8C:
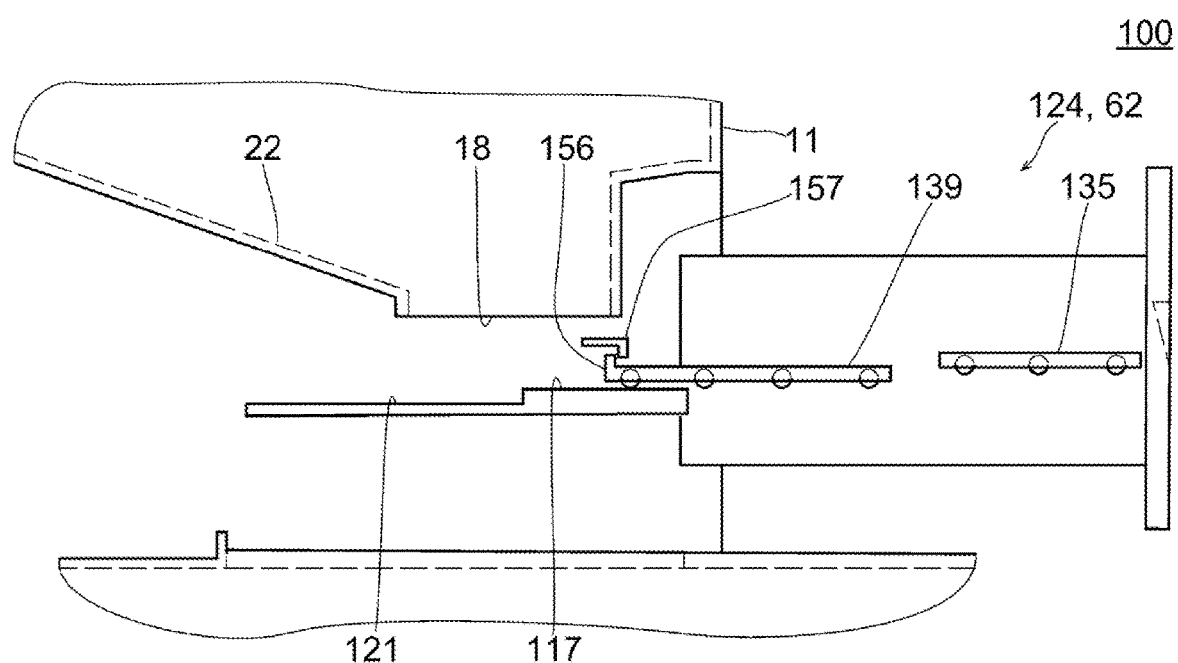
FIG. 8C is a cross-sectional view showing the drawer in FIG. 8A pulled out to a drawer end.

The end stopper 157 is disposed, for example, on the frame plate 20. As shown in FIG. 8A, the end stopper 157 is, for example, L-shaped as viewed from the side. The end stopper 157 guides the lower slider 139 when the drawer 124 is pulled close to the drawer end 62. As shown in FIG. 8C, when the drawer 124 is pulled out to the drawer end 62, the end stopper 157 abuts against an end hook 156.

FIG. 8A shows the drawer 124 at the stowed position 60. For convenience, the frame plate 20 is omitted in FIG. 8A. As shown in FIGS. 7 and 8A, the upper slider 135 includes a roller 135a. Preferably, the upper slider 135 includes a plurality of rollers 135a. The roller 135a is exposed to the lower side of the upper slider 135. The roller 135a rolls on the upper surface of the upper rail 117. The lower slider 139 includes a roller 139a.

The configuration of the lower slider 139 is substantially the same as the upper slider 135. However, the lower slider 139 is longer than the upper slider 135. For example, the lower slider 139 protrudes forward from the back plate 129. The rear end of the lower slider 139 is located in front of the step 119. The latch portion 137 is disposed, for example, at the rear end of the lower slider 139. When the drawer 124 is pulled out to the intermediate position 61, the latch portion 137 abuts against the step 119.

The lower slider 139 may have the end hook 156. The end hook 156 extends upward from the front end of the lower slider 139. When the drawer 124 is at the drawer end 62, the end hook 156 abuts against the end stopper 157. This prevents the drawer 124 from falling.

As shown in FIG. 8A, at the stowed position 60, the discharge port 18 is positioned above the bottom plate 131, and the filter 132 is positioned above the inflow port 15*a*. Thus, the cleaning liquid 7 discharged from the discharge port 18 is filtered by the filter 132 to flow into the inflow port 15*a*.

When the operator pulls out the drawer 124, the latch portion 137 collides with the step 119, and the drawer 124 stops at the intermediate position 61. Even when the drawer 124 is at the intermediate position 61, the discharge port 18 is located above the bottom plate 131, and the filter 132 is located above the inflow port 15*a*. When the drawer 124 is at the intermediate position 61, the operator can visually recognize the state of the inside of the drawer 124 from the outside. The operator can take out insoluble matter deposited inside the drawer 124 by using scraper.

At the intermediate position 61, the drawer 124 can be further pulled out by pulling up the drawer 124 until the latch portion 137 exceeds the step 119. At the drawer end 62, the end hook 156 abuts against the end stopper 157 to stop the drawer 124. FIG. 8C shows the drawer 124 being pulled to the drawer end 62. At the drawer end 62, the operator can remove the drawer 124 from the cleaning machine 100.

The bottom plate 131 and the filter 132 according to the present embodiment is downwardly inclined toward the front. Thus, when the drawer 124 is at the intermediate position 61, the operator can scrape the inside of the drawer 124 by the scraper to clean the drawer 124.

Third Embodiment

Figure 9:
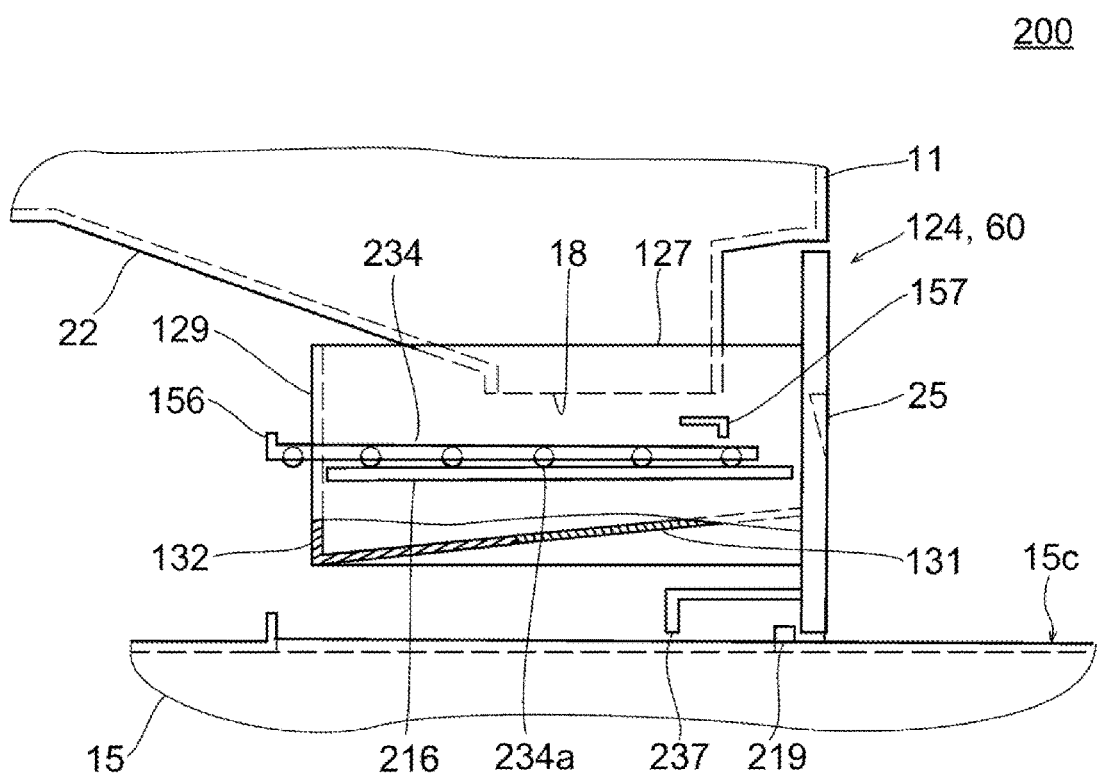
FIG. 9 is a side view showing a duct, a drawer and a guide according to a third embodiment.

As shown in FIG. 9, the cleaning machine 200 according to the third embodiment includes a cleaning chamber 11, a tank 15, a guide rail 216, a drawer 124, a slider 234, a stopper 219, and a hook portion 237. The cleaning machine 200 may include an end hook 156 and an end stopper 157.

The guide rail 216 is a flat guide rail. Unlike the second embodiment, the guide rail 216 of the present embodiment does not have a step. The guide rail 216 extends in the longitudinal direction. The guide rail 216 is disposed, for example, on the frame plate 20.

The slider 234 may include a roller 234*a* and the end hook 156. The slider 234 is disposed on the side plate 127. The roller 234*a* rolls on the guide rail 216.

The stopper 219 is disposed on the upper surface 15*c* of the tank 15. The stopper 219 protrudes from the upper surface 15*c*. For example, the stopper 219 is positioned in front of the front plate 25 of the drawer 124 at the stowed position 60. For example, the hook portion 237, which is L-shaped in a side view, is disposed in front of the front plate 25.

When the drawer 124 is pulled out, the hook portion 237 abuts against the stopper 219 to temporarily stop at the intermediate position 61. At the intermediate position 61, the operator once pulls up the drawer 124 to further pull out the drawer 124. The operator can visually recognize the inside of the drawer 124 at the intermediate position 61.

According to the present embodiment, as the stopper 219 is located below the cleaning chamber 11, the operator walking on the upper surface 15*c* of the tank 15 does not trip over the stopper 219.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

7 Cleaning liquid (Processing liquid)
10, 100, 200 Cleaning machine (Processing machine)
11 Cleaning chamber (Processing chamber)
15 Tank
15*a* Inflow port
16 Guide
17 Upper guide groove (Upper guide)
18 Discharge port
19, 119 Step (Stopper)
21 Lower guide groove (Lower guide)
24, 124 Drawer
25 Front plate
27, 127 Side plate
29, 129 Back plate
31, 131 Bottom plate
34, 134, 234 Slider
35 Upper sliding surface (Upper slider)
37, 137, 237 Latch portion
39 Lower sliding surface (Lower slider)
116, 216 Guide rail (Guide)
117 Upper guide
121 Lower guide
135 Upper slider
139 Lower slider
219 Stopper

What is claimed is:

1. A processing machine, comprising:
a processing chamber having a discharge port facing downwardly;
a tank fixed to the processing chamber, the tank having an inflow port below the discharge port with a gap;
a drawer configured to be stowed in the processing chamber and pulled out rearward from the processing chamber, the drawer including
 a front plate located rearward of the processing chamber,
 a pair of side plates connected to the front plate, and
 a bottom plate connected to the front plate and the pair of side plates, the bottom plate including a filter disposed in a front portion,
a guide configured to guide the drawer, the guide including a stopper; and
a slider configured to reciprocate along the guide, the slider including a latch portion configured to collide with the stopper to stop the drawer at an intermediate position;
wherein the discharge port is located above the bottom plate, and the filter is located above the inflow port when the drawer is located at the intermediate position.

2. The processing machine according to claim 1, wherein the guide includes
a lower guide, and
an upper guide located above and behind the lower guide toward the drawer,
the stopper is a step disposed between the lower guide and the upper guide,
the slider includes
a lower slider disposed in a movable manner along the guide, and
an upper slider disposed in a movable manner along the guide, the upper slider disposed above and behind the lower slider.

3. The processing machine according to claim 1, wherein the drawer includes a back plate connected to the bottom plate and the pair of side plates.

4. The processing machine according to claim 1, further comprising:
a basket filter removably disposed inside the drawer.

5. The processing machine according to claim 4, wherein the drawer includes a hanging portion located inside the drawer, and
the basket filter is hung on the hanging portion.

6. The processing machine according to claim 5, wherein the basket filter includes a pair of handles extending upward from an upper portion,
the processing machine further comprising a duct having the discharge port, the duct arranged inside the processing chamber so as to be sandwiched between the pair of handles.

7. The processing machine according to claim 1, wherein the guide is a guide groove located on the tank,
the lower slider is a lower sliding surface located on a lower surface of the side plate,
the upper slider is an upper sliding surface located on the lower surface of the side plate, and
the stopper is a step located at a connecting portion between the lower sliding surface and the upper sliding surface.

8. The processing machine according to claim 1, wherein the guide is a guide rail, and
the upper slider and the lower slider include a roller configured to roll on the guide rail.

9. The processing machine according to claim 1, further comprising:
a duct having the discharge port, the duct arranged inside the processing chamber so as to be sandwiched between the pair of the side plates,
wherein the pair of side plates extends above the discharge port.

10. The processing machine according to claim 2, wherein the drawer includes a back plate connected to the bottom plate and the pair of side plates.

11. The processing machine according to claim 2, further comprising:
a basket filter removably disposed inside the drawer.

12. The processing machine according to claim 3, further comprising:
a basket filter removably disposed inside the drawer.

13. The processing machine according to claim 2, wherein the guide is a guide groove located on the tank,
the lower slider is a lower sliding surface located on a lower surface of the side plate,
the upper slider is an upper sliding surface located on the lower surface of the side plate, and
the stopper is a step located at a connecting portion between the lower sliding surface and the upper sliding surface.

14. The processing machine according to claim 3, wherein the guide is a guide groove located on the tank,
the lower slider is a lower sliding surface located on a lower surface of the side plate,
the upper slider is an upper sliding surface located on the lower surface of the side plate, and
the stopper is a step located at a connecting portion between the lower sliding surface and the upper sliding surface.

15. The processing machine according to claim 4, wherein the guide is a guide groove located on the tank,
the lower slider is a lower sliding surface located on a lower surface of the side plate,
the upper slider is an upper sliding surface located on the lower surface of the side plate, and
the stopper is a step located at a connecting portion between the lower sliding surface and the upper sliding surface.

16. The processing machine according to claim 5, wherein the guide is a guide groove located on the tank,
the lower slider is a lower sliding surface located on a lower surface of the side plate,
the upper slider is an upper sliding surface located on the lower surface of the side plate, and
the stopper is a step located at a connecting portion between the lower sliding surface and the upper sliding surface.

17. The processing machine according to claim 6, wherein the guide is a guide groove located on the tank,
the lower slider is a lower sliding surface located on a lower surface of the side plate,
the upper slider is an upper sliding surface located on the lower surface of the side plate, and
the stopper is a step located at a connecting portion between the lower sliding surface and the upper sliding surface.

18. The processing machine according to claim 2, further comprising:
a duct having the discharge port, the duct arranged inside the processing chamber so as to be sandwiched between the pair of the side plates,
wherein the pair of side plates extends above the discharge port.

19. The processing machine according to claim 3, further comprising:
a duct having the discharge port, the duct arranged inside the processing chamber so as to be sandwiched between the pair of the side plates,
wherein the pair of side plates extends above the discharge port.

20. The processing machine according to claim 4, further comprising:
a duct having the discharge port, the duct arranged inside the processing chamber so as to be sandwiched between the pair of the side plates,
wherein the pair of side plates extends above the discharge port.

* * * * *